(12) United States Patent
Farley

(10) Patent No.: US 8,994,201 B2
(45) Date of Patent: Mar. 31, 2015

(54) VERTICAL AXIS WIND TURBINE

(71) Applicant: WindLabs, Inc., Raleigh, NC (US)

(72) Inventor: Greg Farley, Whiteville, NC (US)

(73) Assignee: Wind Labs, Inc., Raleigh, NC (US)

( * ) Notice: Subject to any disclaimer, the term of this patent is extended or adjusted under 35 U.S.C. 154(b) by 166 days.

(21) Appl. No.: 13/842,687

(22) Filed: Mar. 15, 2013

(65) Prior Publication Data

US 2013/0270824 A1   Oct. 17, 2013

Related U.S. Application Data

(60) Provisional application No. 61/622,762, filed on Apr. 11, 2012, provisional application No. 61/623,099, filed on Apr. 12, 2012.

(51) Int. Cl.
*F03D 9/00* (2006.01)
*H02P 9/04* (2006.01)
*F03D 7/06* (2006.01)

(52) U.S. Cl.
CPC ..... *H02P 9/04* (2013.01); *F03D 9/003* (2013.01); *F03D 7/06* (2013.01); *F05B 2260/903* (2013.01)
USPC .......................................................... 290/44

(58) Field of Classification Search
CPC ............. H02P 9/04; F03D 9/003; F03D 7/06; F03D 9/00; F05B 2260/903
USPC .......................................... 290/44, 43, 55, 54
See application file for complete search history.

(56) References Cited

U.S. PATENT DOCUMENTS

| 6,327,994 B1 * | 12/2001 | Labrador .................. 114/382 |
| 2007/0040385 A1 | 2/2007 | Uchiyama |
| 2010/0192572 A1 | 8/2010 | Kamohara et al. |

FOREIGN PATENT DOCUMENTS

| JP | 2001331098 A | 11/2001 |
| RU | 2383778 C2 | 10/2010 |

OTHER PUBLICATIONS

Canadian Patent Office Action dated Apr. 10, 2014 for corresponding Canadian application No. 2812401.

* cited by examiner

*Primary Examiner* — Javaid Nasri
(74) *Attorney, Agent, or Firm* — NKK Patent Law, PLLC

(57) ABSTRACT

A turbine assembly is provided. The turbine assembly includes a plurality of sails and a generator assembly configured to convert rotation thereabout to power. A brake assembly may be provided. The brake assembly may include a magnet assembly that rotates with rotation of the plurality of sails, a conducting plate initially spaced-apart from the magnet assembly, and an actuator for translating the conducting plate relative to the magnet assembly during rotation thereof to thereby induce eddy currents that create a magnetic field acting on the conducting plate to impart a retarding force to control the rotational speed thereof. A control module is configured to control the actuator to adjust the spacing between the magnet assembly and the conducting plate in order to maintain the turbine assembly at a predetermined speed.

23 Claims, 15 Drawing Sheets

VERTICAL AXIS WIND TURBINE

CROSS-REFERENCE TO RELATED APPLICATIONS

This application claims priority to U.S. Provisional Patent Application No. 61/622,762 filed on Apr. 11, 2012 and U.S. Provisional Application No. 61/623,099 filed on Apr. 12, 1012, the entire contents of both of which are hereby incorporated by reference herein.

FIELD OF THE INVENTION

The present invention relates to wind turbines, and more particularly to a vertical axis wind turbine that has improved energy harnessing capabilities and wind turbine speed management.

BACKGROUND OF THE INVENTION

Wind turbines are used for generating electricity or otherwise providing electrical or mechanical power. Wind turbines rely on winds in order to impart rotation of propellers that are carried by a central rotor shaft. The rotor shaft is then operably coupled to a generator in instances where electricity is being generated or to a mechanical apparatus when conversion of mechanical power is desired.

Wind turbines are desirable because of low maintenance costs and the use of available "free" wind in order to generate clean energy. However, since wind turbines rely on wind to generate energy and because the speed of the wind correlates to the efficiency of the wind turbine, having the wind turbine rotate at an optimal speed is desired. When the wind is blowing at too high of a speed, the electricity generated is at a frequency in excess of what is allowed to be transported to the electrical grid. In order to compensate for excess wind speed, some wind turbines employ a mechanical or electrical brake in order to reduce the rotation speed of the wind turbine. These brakes are generally sufficient for controlling the speed, however, they do not capture the energy that would otherwise be created at high wind speeds and instead convert that energy into waste heat. The lack of sufficient rotational speed control causes the inverter downstream of the wind turbine to shut down, thus causing downtime in which electricity is not being generated.

Accordingly, a need exists for a method or apparatus for effectively monitoring the rotation speed of a wind turbine and capturing energy that would otherwise not be generated by conventional devices.

SUMMARY OF THE INVENTION

In accordance with one or more embodiments disclosed herein, a turbine assembly is provided.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DESCRIPTION

Figure 1:
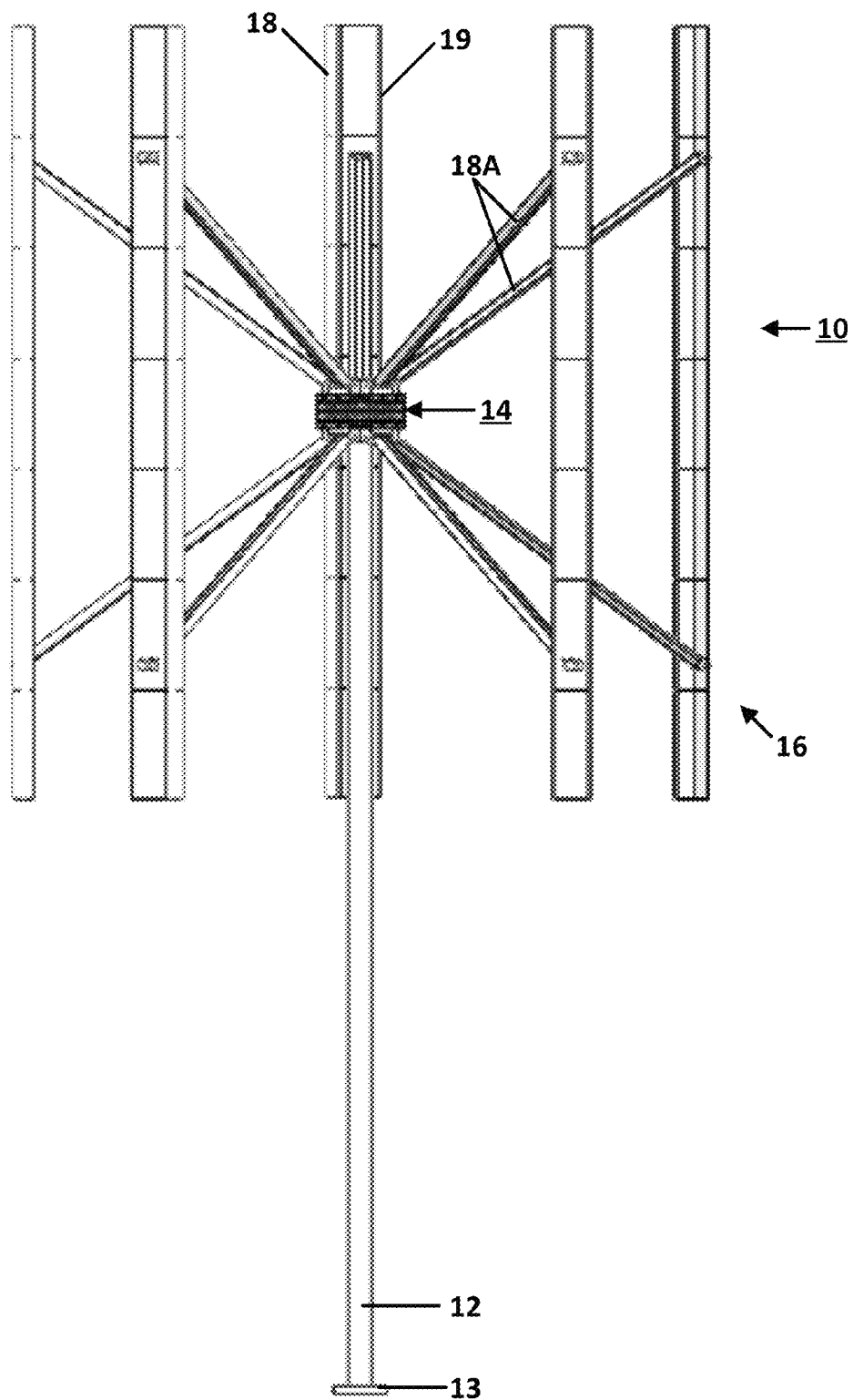
FIG. 1 illustrates a perspective view of a wind turbine assembly according to one or more embodiments disclosed herein.

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Disclosed herein is a wind turbine that is generally designated 10. The one or more embodiments illustrated includes a vertical axis wind turbine 10, though horizontal or non-orthogonal axis wind turbines may be equally advantageously equipped with the one or more improvements disclosed herein. Wind turbine 10 includes a plurality of sails with each being indicated generally by the numeral 16. The wind turbine 10 includes a central post 12 for supporting the sails. Central post 12 may also include a support 13 for supporting the post 12 about a ground surface. The wind turbine 10 includes a generator assembly 14 that is configured for generating energy with a rotor/stator assembly that will be further described herein and for controlling the rotation speed of the wind turbine. Any appropriately configured generator assembly may be further used in addition to the generator assembly 14 for generating electricity. Each sail 16 is operatively connected to drive the generator assembly 14 through a series of arms 18A. It will be appreciated that as the sails 16 are driven by wind, the turning or movement of the sales will in turn cause the generator assembly 14 to be driven, which in turn results in the generation of electrical energy. Control of the rotation speed of the turbine 10 and thus the generator assembly 14 will be further discussed herein.

Figure 2:
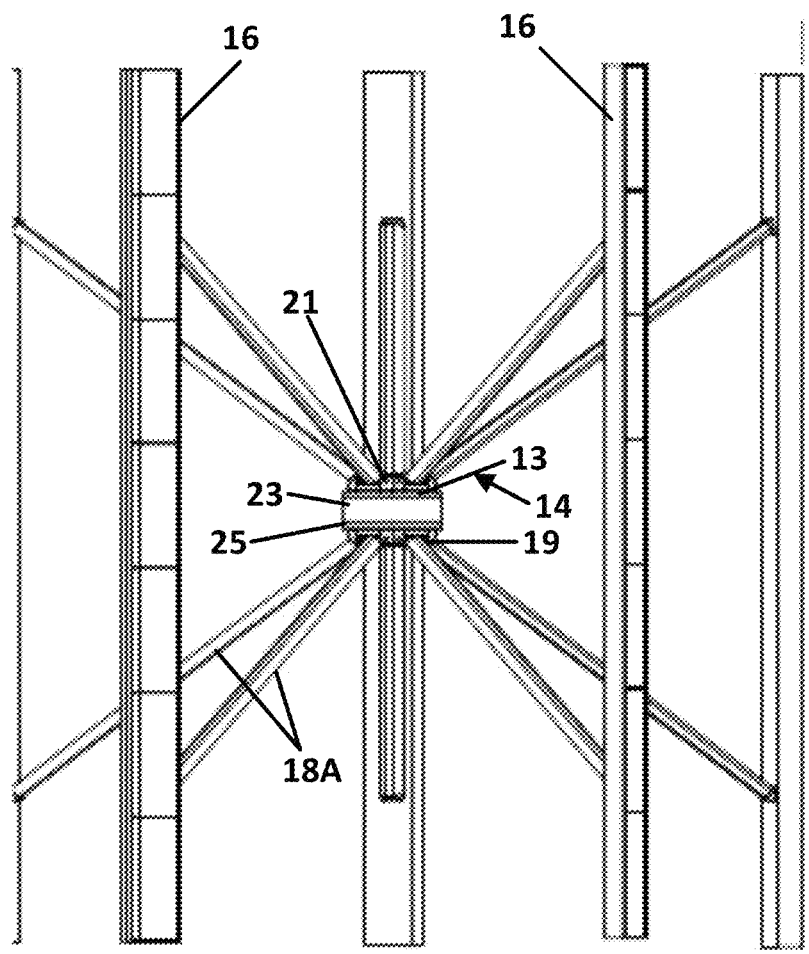
FIG. 2 illustrates an enlarged view of an electromagnetic assembly and turbine assembly according to one or more embodiments disclosed herein.

An enlarged view of the generator assembly 14 and portion of turbine 10 is illustrated in FIG. 2. The generator assembly 14 defines a support 19 on each of the top and bottom surfaces thereof that receives each of arms 18A. In this manner, the arms 18A extend in a generally upwardly diagonal direction and a generally downwardly diagonal direction from the generator assembly 14. A pin 21 is received through an opening defined in each support 19 and engageably receives an end of each of the arms 18A. In this manner, arms 18A are capable of upward and downward movement with sail 16 and are replaceable or removable if desired.

Generator assembly 14 may include a housing 13 that has an identical top and bottom portion 23 and 25 that maintains the internal components in precise arrangements. In one embodiment, the design allows for the attachment of ten separate arms 18A between the generator assembly 14 and sails 16, and thus five sails 16. In one or more embodiments, each arm 18A is positioned at an even 72 degrees apart from each other arm 18A and thus provides maximum stress distribution amongst the joints. The bolt patterns may be identical through the internal sections of the generator assembly 14 and the top and bottom cast will lock the separate pieces into one unit. The straight edges around the cast have been reduced at least to a ⅛" chamfer (*cc) to reduce the structural stresses on the unit.

While the turbine assembly 10 is shown with five sails 16, in appropriate embodiments it may be provided with more or less sails 16. Additionally, while the turbine assembly 10 is shown having arms 18A originating from the generator assembly 14, only one arm or multiple arms of a different shape, configuration, and size may be employed if desired.

Arm 18A allows for a displacement to an angle of 90 degrees for portability. The lateral walls of the arm 18A have been tapped with one half inch holes to allow the positioning of the lock pin which will help hold the arms 18A in position.

The wind turbine assembly 10 described herein is a vertical axis wind generator. In one or more embodiments, the turbine assembly 10 may be rated to produce 10 KW. The turbine assembly 10 is designed to be modular, thereby avoiding major structural alteration to step up or down to various capacity generators. If desired, one or more turbines 10 may be employed in series or parallel to reach a desired energy output. Additionally, in one or more embodiments, multiple generator assemblies 14 may be employed on one central shaft 12 in order to reach a desired signal output.

Figure 3:
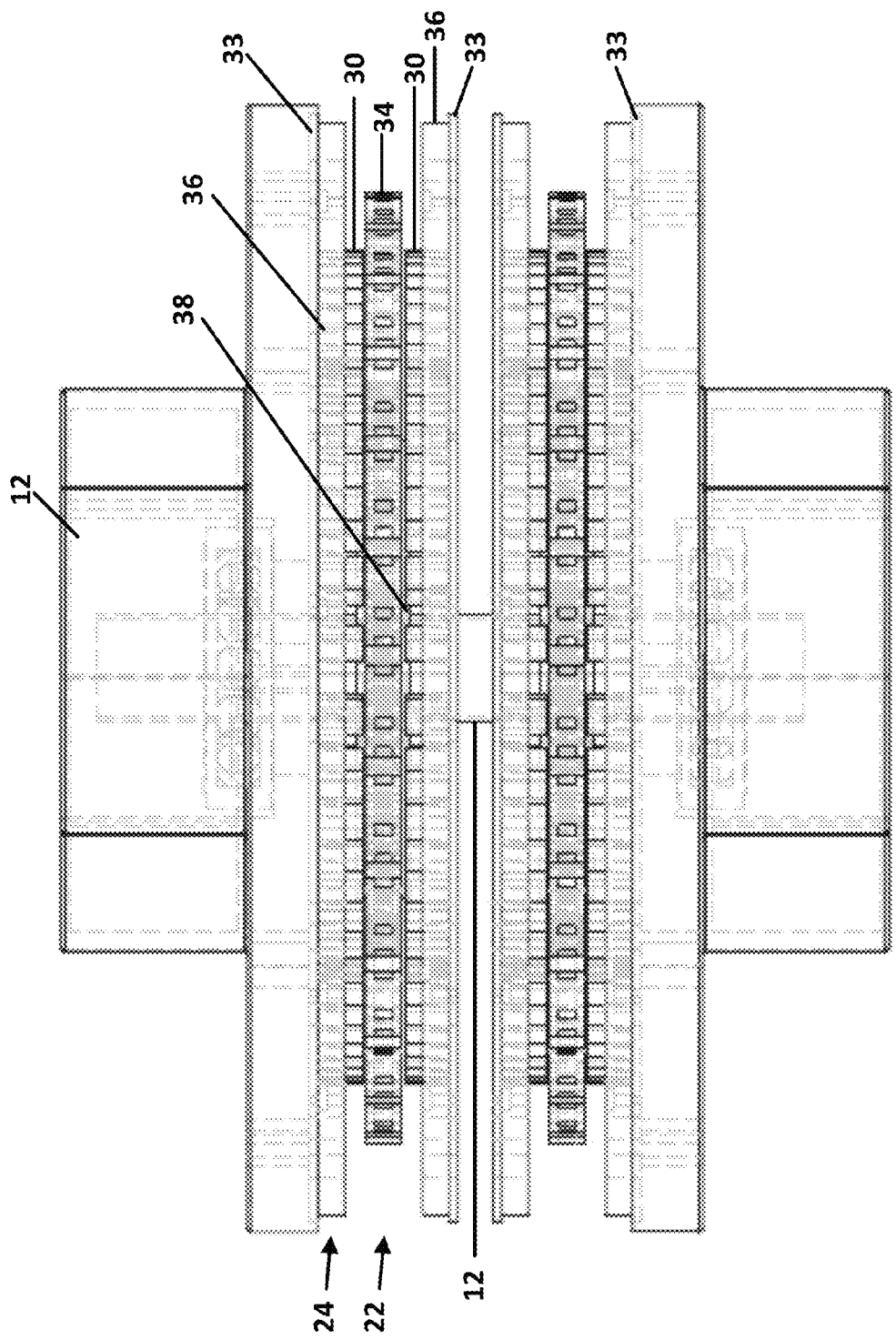
FIG. 3 illustrates an exploded interior view of the electromagnetic assembly according to one or more embodiments disclosed herein.

As illustrated more closely in FIG. 3, the generator assembly 14 includes a stator 22 and a rotor 24. As illustrated more closely in FIG. 4 and with additional reference to FIGS. 5 through 8, the stator 22 includes a coil mold 34 that has the one or more coil assemblies 27 carried therein. The coil pack assemblies 27 will be described further herein.

Figure 5:
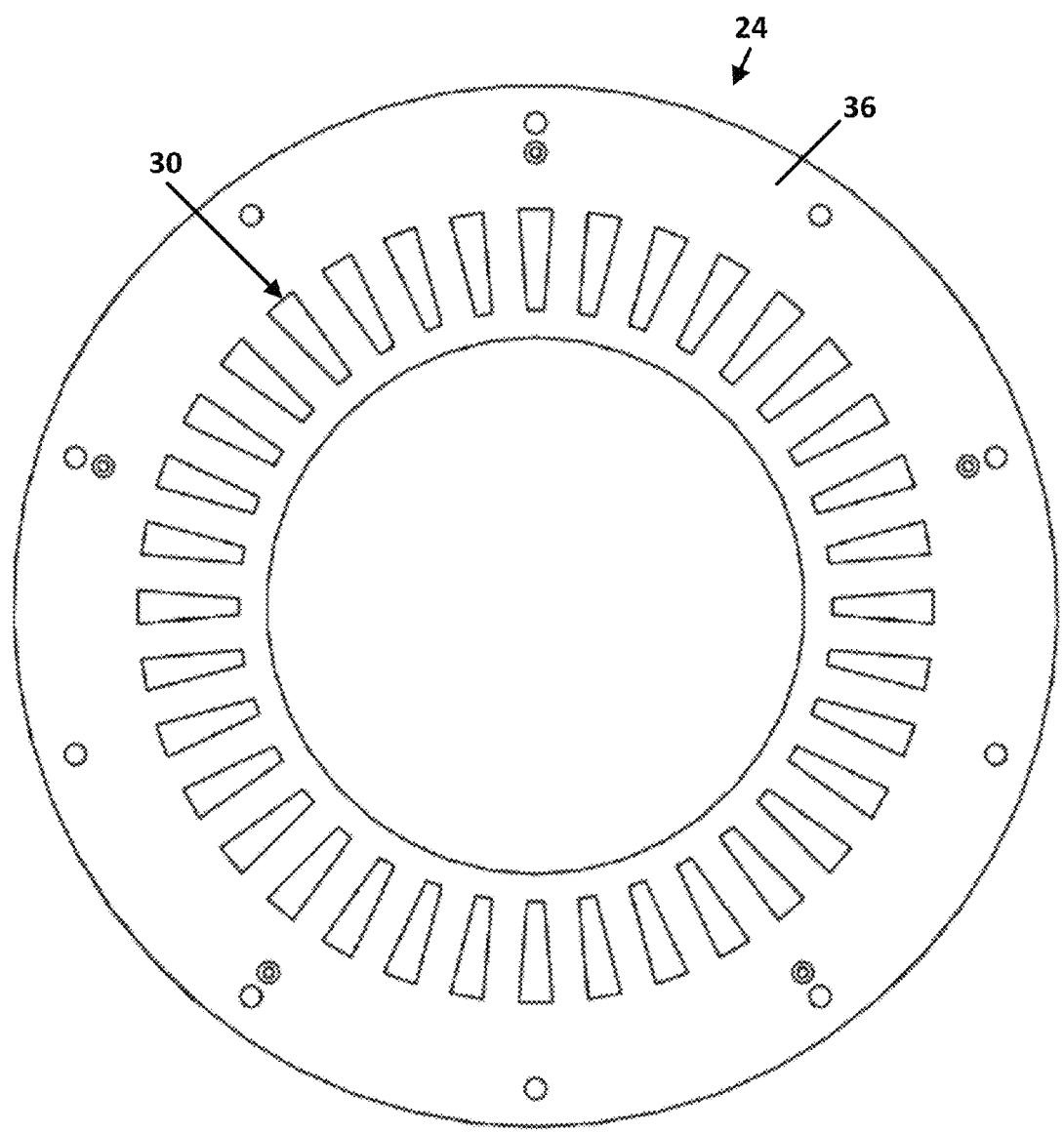
FIG. 5 illustrates a top view of a magnet mold for use with the electromagnetic assembly according to one or more embodiments disclosed herein.
Figure 6:
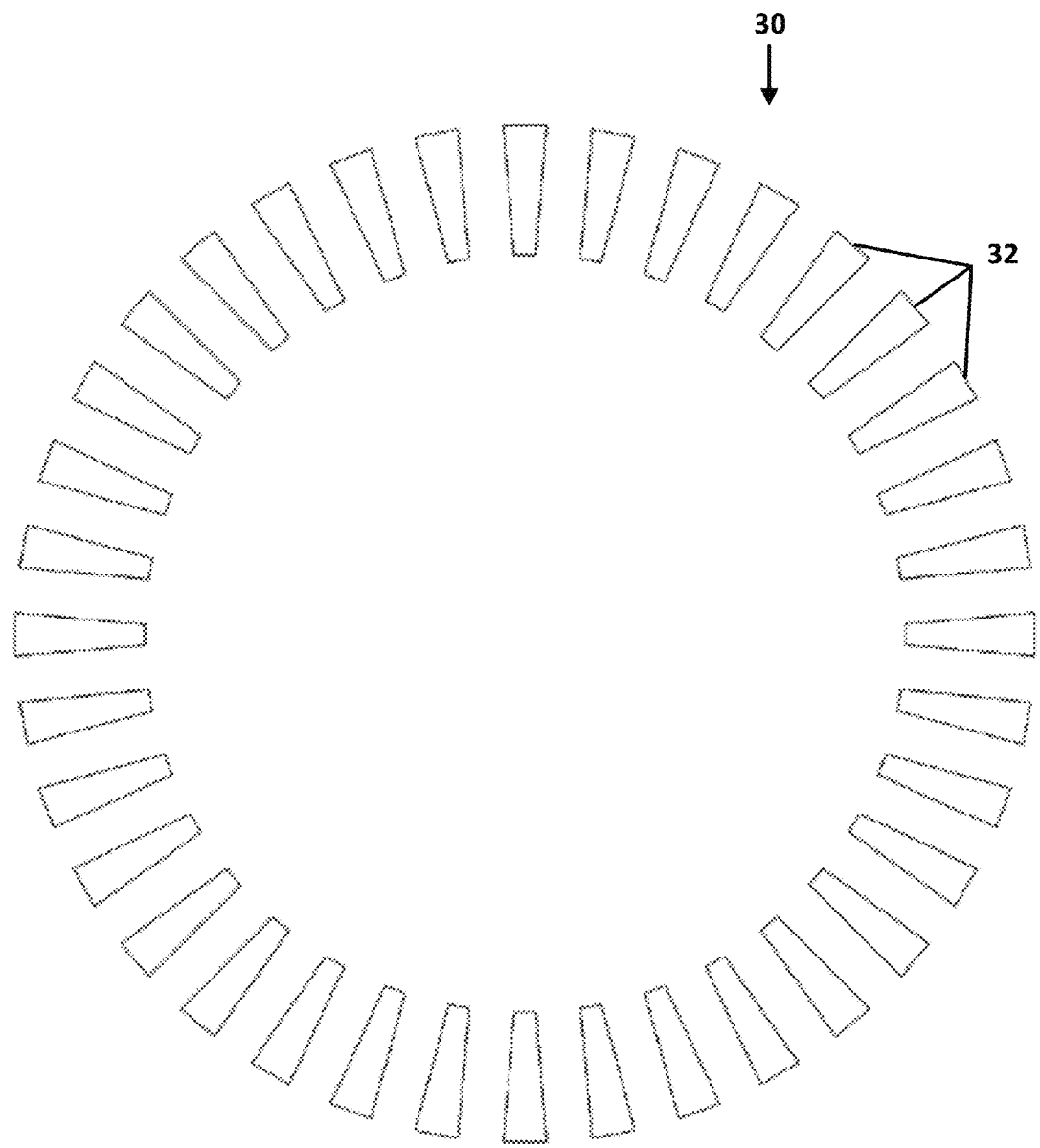
FIG. 6 illustrates a top view of a magnet assembly for use with the electromagnetic assembly according to one or more embodiments disclosed herein.

As illustrated more closely in FIG. 5, the rotor 24 includes a plate 36 to which a magnet ring 30 illustrated in FIG. 6 is provided about. The magnet ring 30 that may include a plurality of spaced-apart magnets 32. The magnets 32 will be described further herein.

In operation, the thrust generated by the sails 16 in a wind environment drives the rotor 24 around the stator 22 inducing a current in the coil assembly coil mold 34 and thereby generating power. Stator 22 is configured to be stationary while rotor assembly 24 rotates about the stator 22. This is accomplished because plate 33 is attached directly to the housing 13 where the coil mold 34 is fixedly attached to the center shaft 12. In appropriate embodiments, stator 22 may be configured for rotating about rotor assembly 24.

Figure 4:
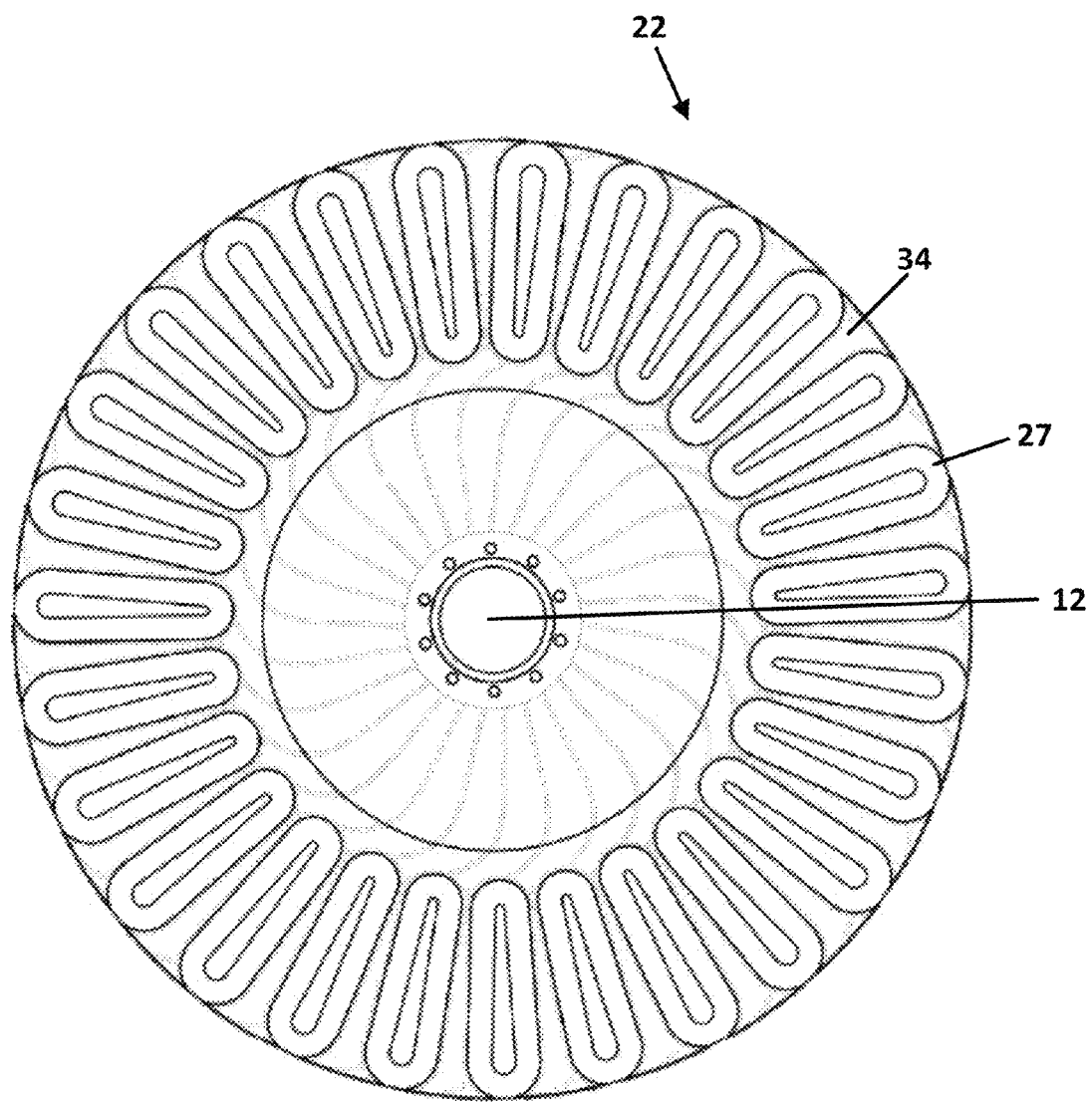
FIG. 4 illustrates a top view of a coil mold and associated coil packs for use with the electromagnetic assembly according to one or more embodiments disclosed herein.
Figure 7:
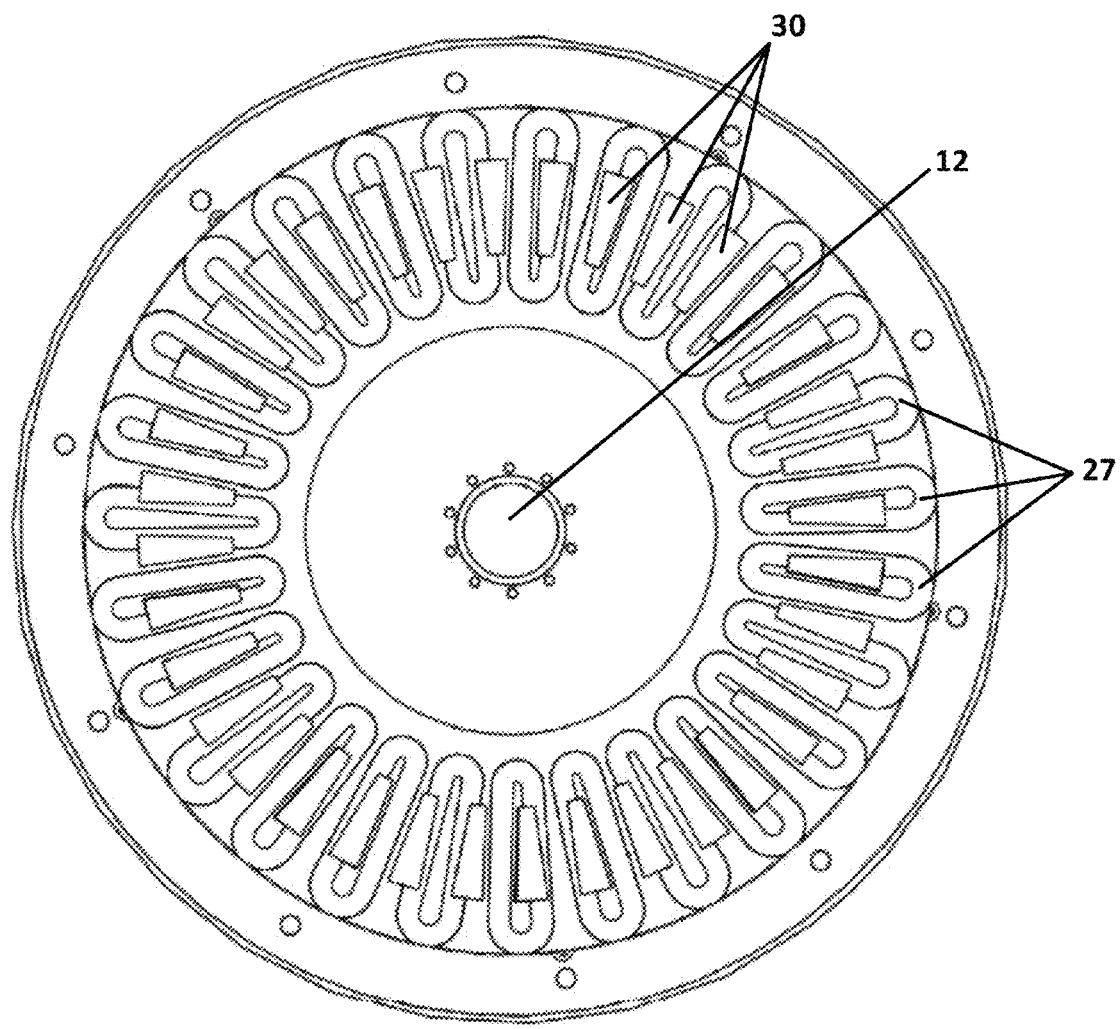
FIG. 7 illustrates a layout of coil packs to magnet ratio according to one or more embodiments disclosed herein.

In one or more embodiments, there are provided twenty seven (27) coil pack assemblies 27 that are circumferentially spaced-apart at an angle of 13.3 degrees from each other as illustrated more closely in FIG. 4 and FIG. 7. The angle 13.3 degrees has been advantageously determined to maintain a 3:4 coil assembly coil mold 34 to magnet 30 ratio which has been found to minimize the conversion losses by producing extremely clean 3-phase alternating current (AC). This is advantageously depicted in the overhead, exploded view of FIG. 7 in which the coil assemblies 27 and magnets 30 are depicted. The coil pack assemblies 27 are wired using the star convection to maximize voltage at low RPM. The coil pack assemblies 27 have also been designed to be able to stack over one another thereby making the whole unit modular. The coils pack assemblies 27 are divided into three separate phases each consisting of two 12 gauge windings and seven 16 gauge windings to maximize voltage. The separate phases may also be routed through a capacitor circuit to regulate the induction shocks. A capacitor-diode interface may be provided between the coils 27 in order to provide a check on residual harmonics backtracking through the generator assembly 14 and thus dissipate shocks or vibrations.

In one or more embodiments, the magnet assembly 30 and magnets 32 are laid out as 36 Neodymium permanent magnets 30 held at an even 10 degrees apart from each other as illustrated in FIG. 6. This angle maintains the 3:4 coil:magnet ratio as disclosed herein. The magnets 30 have been wedged towards the center shaft 12 to align the fields with conductors of the coils 27 to promote magnetic induction.

Figure 8:
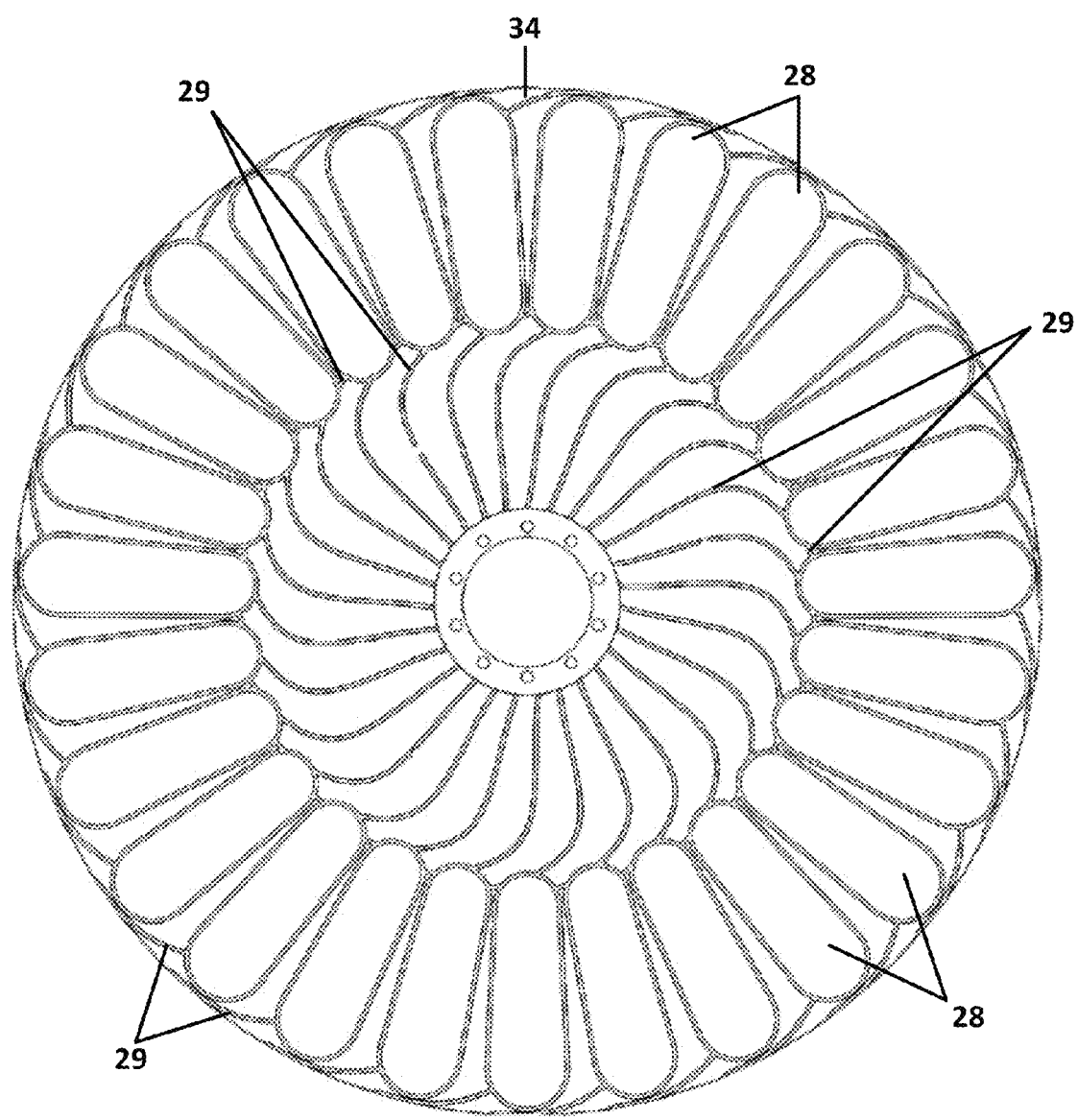
FIG. 8 illustrates a coil mold having one or more vents defined between adjacent coil recesses in which coil packs are received according to one or more embodiments disclosed herein.

Coil mold 34 is provided around the coil pack assemblies 27 to help position the coil pack assemblies 27 within acceptable tolerances. The coil mold 34 may define one or more vents 29 for allowing the ventilation of heat generated during the induction cycles between adjacent coil pack assembly housings 28 as illustrated in FIG. 8. The added ventilation will help maintain the temperature of the stator 22 thereby improving overall efficiency and power generation. The coil mold 34 may also be lined with sheets of ferrous metal to guide the flux lines and thereby attain maximum saturation of coils. In one or more experiments, both the ventilation and ferrous material dramatically improve generation potential.

A coil plate 38 may be provided and may attach to the center shaft 12. The coil plate 38 may be made from aluminum. The coil plate 38 is bolted on to the coil mold 34 to minimize the torsional loads acting at the joints of the mold 34. This may advantageously reduce or even out vibrations and improve the life of the stator 22 as a whole.

A magnet mold 36 may be provided to align the opposite poles of the magnets 30 on to the magnet plate 32. The magnet mold 36 may be provided to stabilize the opposing fields generated by the coils 27 and coil mold 34 and will induced current flows through circuitry operably coupled with the generator assembly 14. The magnet mold 36 is connected to the outer cast of housing 13 and spins along with the rest of the generator assembly 14.

A magnet plate may also be provided. The magnet plate may be a steel plate that is used to align the magnets and fix them to the rest of the structure before locking the magnet ring in a mold. The plates provide shielding to the magnetic pole opposite the coil pack assemblies 26 and plate 27 thereby strengthening the adjacent poles and boosting the power generation.

Vertical axis wind turbines are designed to be most efficient at lower RPM levels when compared to horizontal axis wind turbines. The generator assembly 14 has been designed with an electromagnetic and an optional frictional brake to control the RPM level and provide reliable power. If necessary, assembly 10 is further in communication with a dump load to which excess energy can be transferred to in order to raise the internal resistance of the generator assembly 14 and cease movement thereof.

Turning to the sails 16, there is a plurality of sails shown in the embodiment of FIG. 1. In the case of the embodiment shown in FIG. 1, there are eight equally spaced sails 16. The number of sails can vary depending upon application and specific design.

Figure 11:
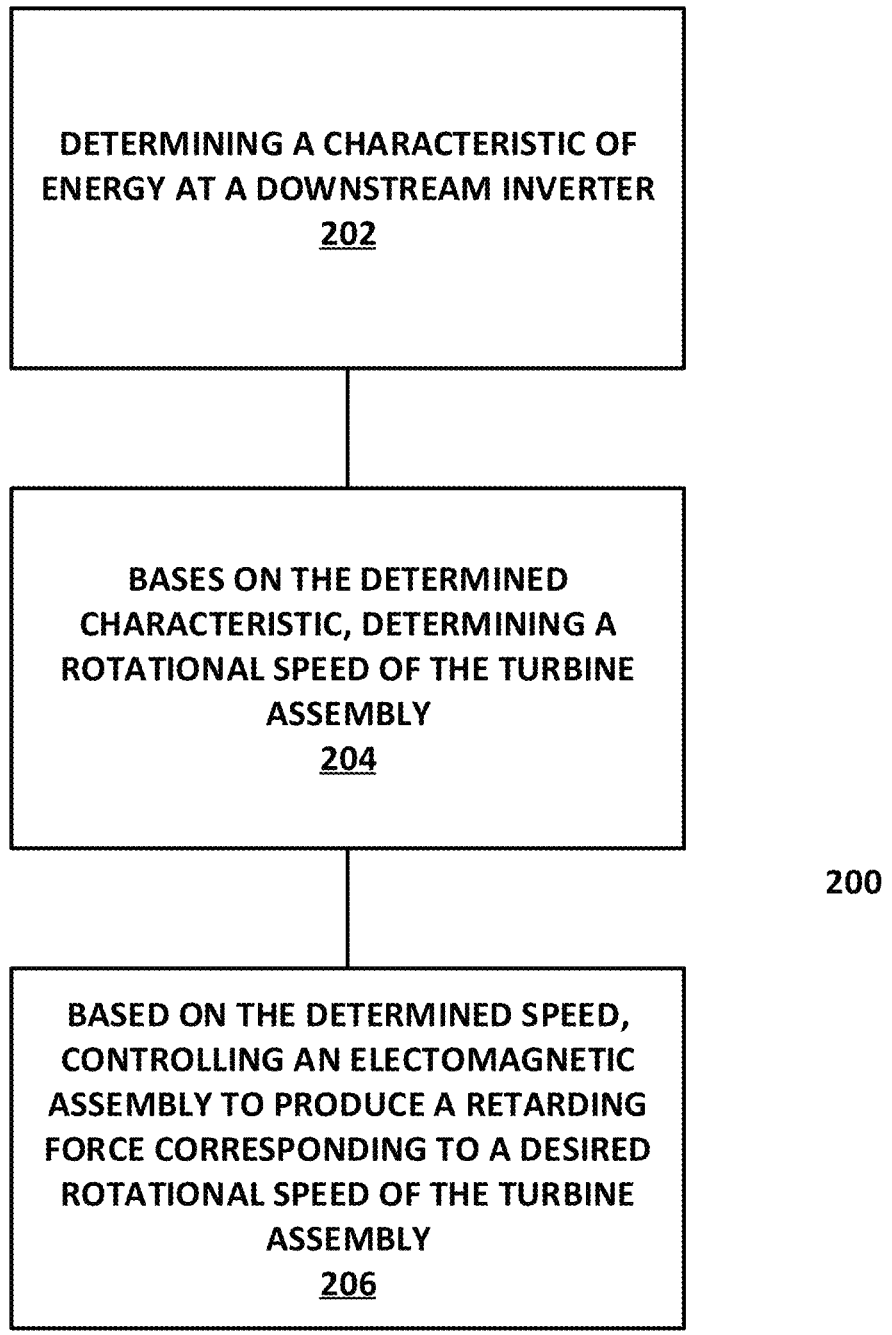
FIG. 11 illustrates a flow chart depicting one or more methods disclosed herein.
Figure 12:
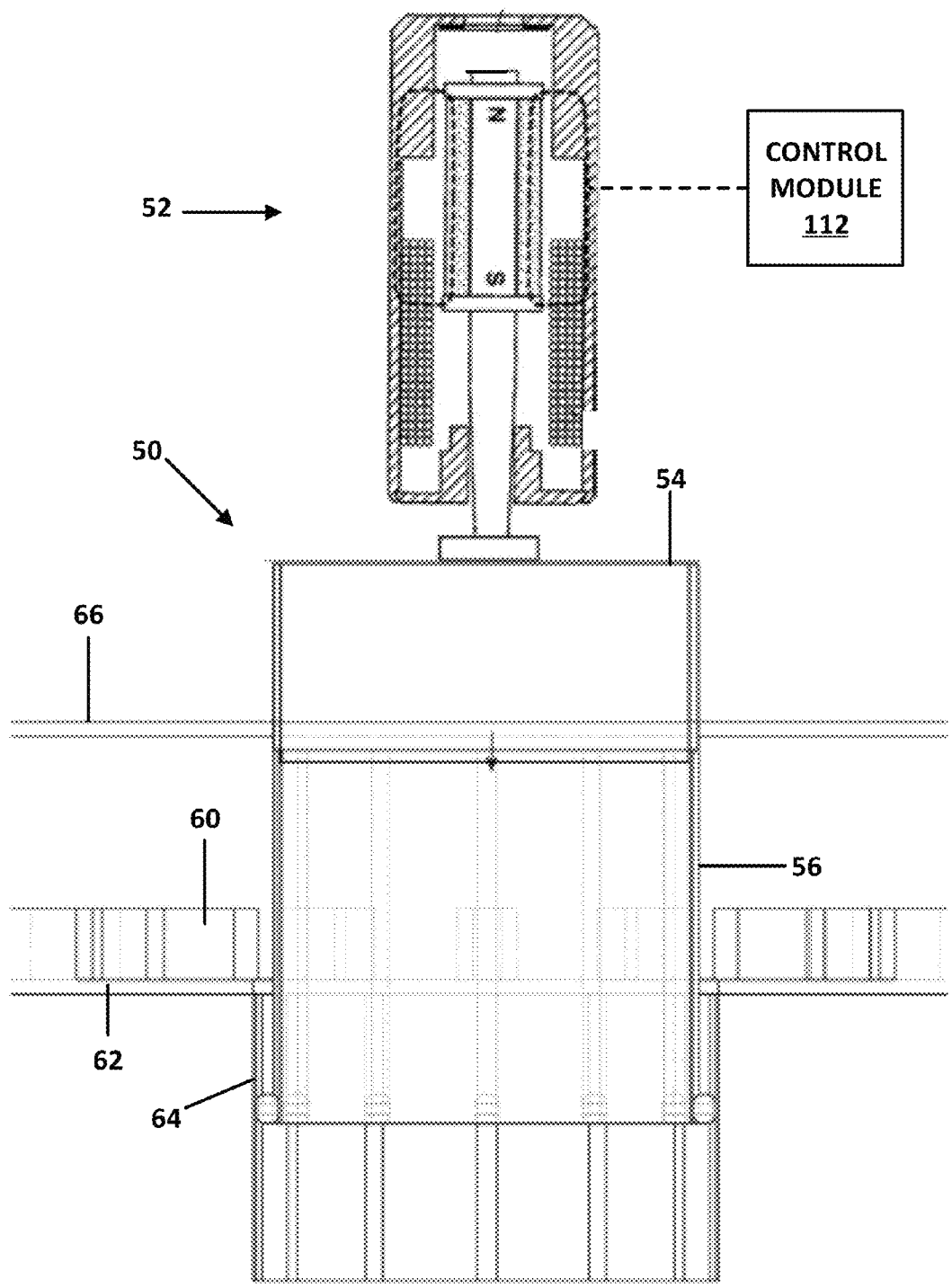
FIG. 12 illustrates a brake assembly for controlling the rotation speed of the turbine assembly disclosed herein.

Also disclosed is a brake assembly 50 illustrated in FIG. 12. The brake assembly 50 may be provided at any point along shaft 12 of the wind turbine 10. The brake assembly 50 may include an actuator 52. Actuator 52 is illustrates as an electrically powered actuator having a magnetic translation mechanism and plunger, though any appropriately provided actuator may function. Actuator 52 is configured for being in contact with plate 54 which is then connect against shaft or cylinder 56. Shaft 56 is connected to the stator shaft or shaft 12 and therefore has no axial rotation. A magnet assembly 60 may be provided along a plate 62 that is coupled to a cylinder or shaft 64. This shaft 64 is operably coupled with sails 16 and is configured for rotation during rotation of the turbine assembly 10. This causes the magnet assembly 60 to also rotate with rotation of the turbine assembly 10. The actuator 52 then communicates with a control module 112 that controls the actuator to translate plate 62 into closer-spaced or further-spaced arrangement relative to the magnet assembly 60. Control module 112 will be discussed with further reference to FIG. 11.

As plate 62 passes into closer-spaced arrangement relative to magnet assembly 60, eddy currents are created within plate 62 due to rotation of the magnet assembly 60 with rotation of turbine 10. This eddy current then creates a magnetic field which usually operates in the reverse direction of rotation of the turbine assembly 10. The brake assembly 50 is thus configured to impart retarding forces on shaft 12 in order to reduce the turbine assembly 10 speed to an acceptable level for most efficient power production.

The actuator 52 may be coupled via control module 112 with an inverter downstream of the turbine assembly 10 or other signal monitoring/conditioning device and is configured to determine the speed of the turbine assembly 10 based on the measurements of the inverter as will be described with further reference to FIG. 10. Additionally, other signal conditioners instead of an inverter may be employed, with similar monitored data from the signal conditioner being used by control module 112 to determine the rotational speed of the turbine assembly 10.

Figure 13:
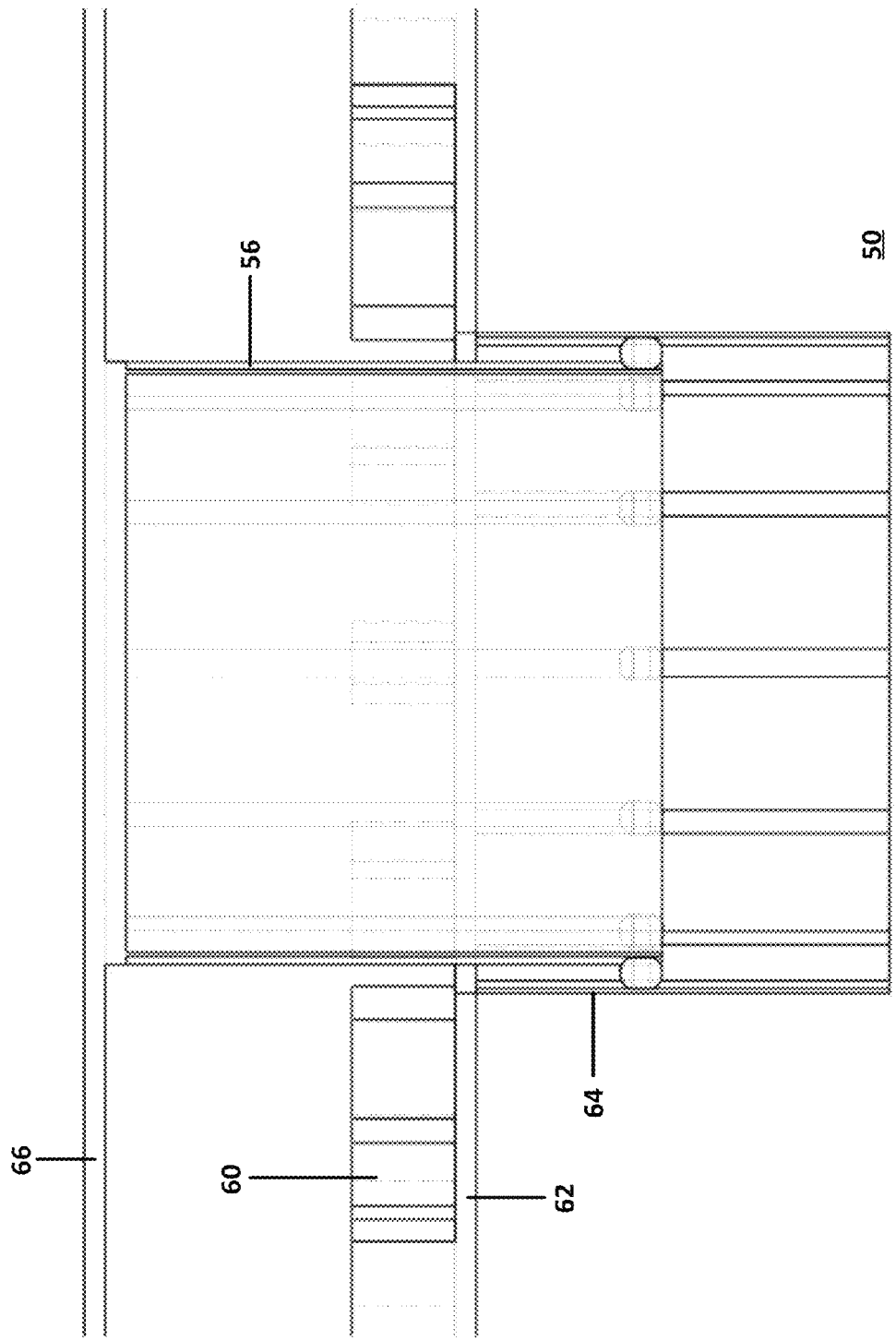
FIGS. 13 through 15 illustrate the brake assembly in various braking positions.
Figure 14:
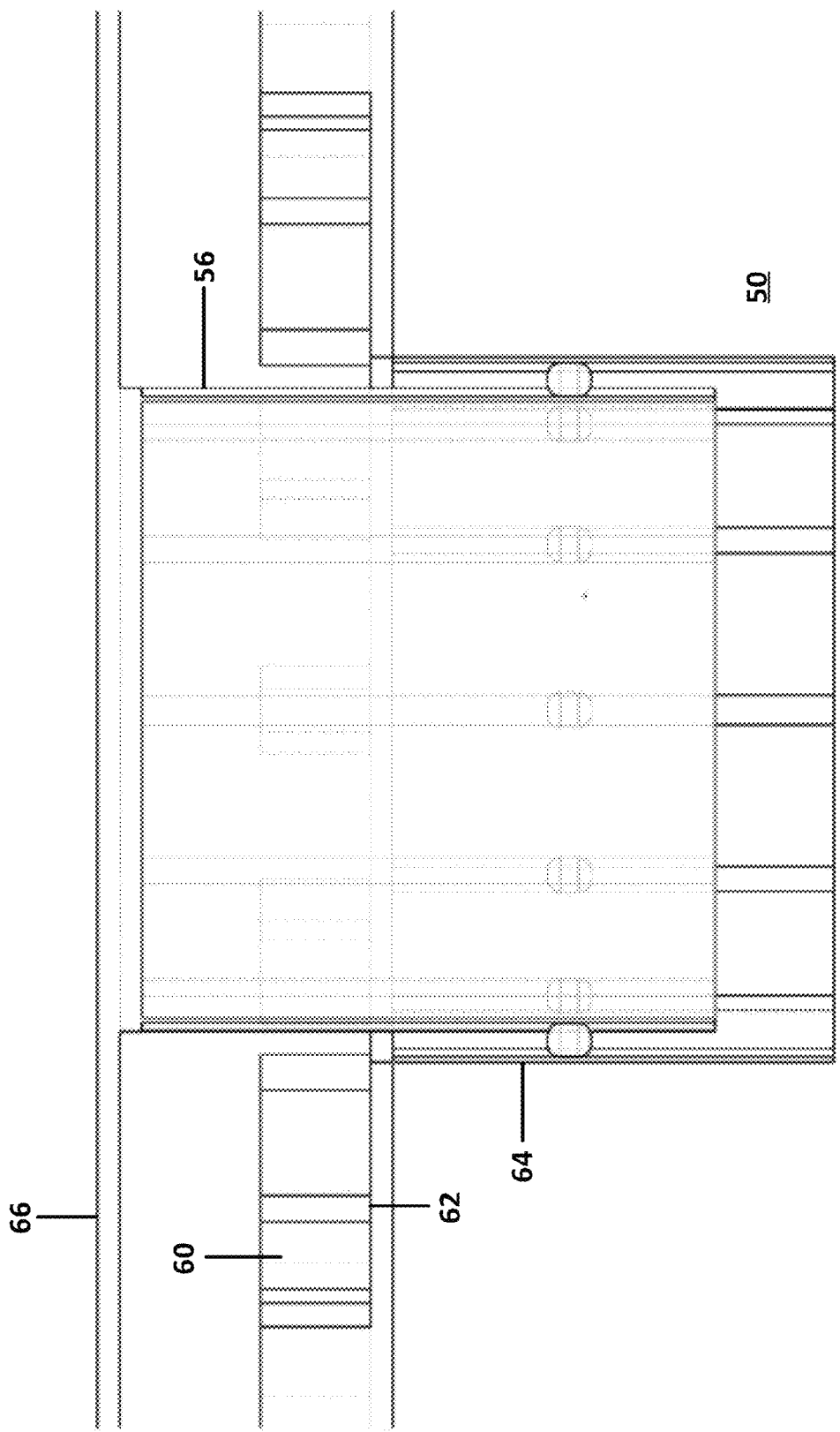
Figure 15:
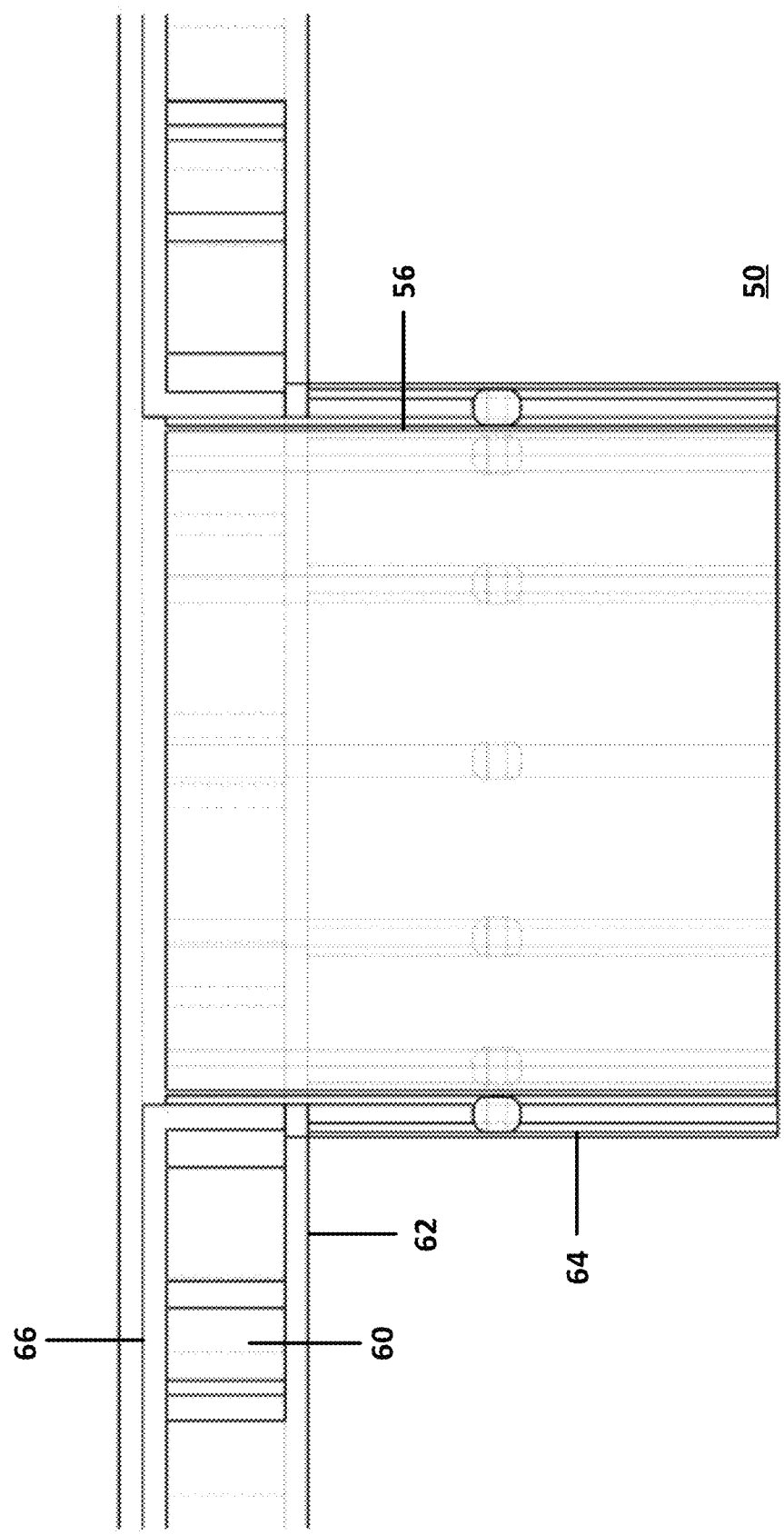

FIGS. 13 through 15 represent various open and closed positions of the braking assembly 50 (with the actuator not shown for clarity purposes). FIG. 13 illustrates the plate 66 being relatively spaced-apart from magnet assembly 60. In this arrangement, the distance between plate 66 and magnet assembly 60 is such that no interaction of eddy currents therebetween is likely to create a retarding force to the turbine assembly 10.

FIG. 14 illustrates the plate 66 being closer-spaced than that which is shown in FIG. 14. In this spacing, the distance between plate 66 and magnet assembly 60 may be such that a moderate amount of retarding forces are created by eddy currents between plate 66 and magnet assembly 60 to thereby reduce the rotational speed of turbine assembly 10.

FIG. 15 illustrates plate 66 being closely-spaced to magnet assembly 60. In this spacing, the distance between plate 66 and magnet assembly 60 is such that a significant amount of retarding forces are created by eddy currents between plate 66 and magnet assembly 60 to thereby reduce the rotational speed of or entirely stop rotation of turbine assembly 10.

Each sail 16 comprises a generally J-shaped structure that is elongated and, as illustrated in FIG. 1 in a typical application, the J-shaped sail is vertically oriented.

The J-shaped sail 16 includes a leading edge or nose section 18. This section is curved and forms an elongated cup along the leading edge of the sale 16. As illustrated in the drawings, the leading edge 18 forms an elongated vertical trough.

Extending from the leading edge or nose section 18 is a back which is generally planar in design. The back extending from the nose section 18 terminates in a trailing edge. There is a plurality of gussets or struts that are spaced apart and which extend from the interior of the nose section 18 to a point just forwardly of the trailing edge. The function of the gussets or struts is to reinforce the sail 16 and to make the sail structurally sound.

The sail 16 can be constructed of various materials such as aluminum, fiberglass, plastic or any other suitable material. The thickness of the sail proper, that is the nose section 18 and the back, in a typical application is approximately ⅛ of an inch to approximately ¼ of an inch. The depth of the curved nose section 18 in one embodiment may be between about 4 and about 6 inches measured radially outwardly from the back 20. The height of the sail 16, as oriented in FIG. 1, in a typical application would be about eighteen feet. However, it is appreciated that these dimensions are for exemplary purposes and that the dimensions of the sail 18 can vary over a significant range depending upon application.

Note that the sail 18 includes two sides, a face or outer side and a back side. The face side would face oncoming wind and the oncoming wind would impinge upon the upper side of the sail 18. The back side of the sail 16 is the lower side of the sail structure. Thus is it appreciated that oncoming wind will impinge upon the face side of the sail and will tend to move along the face side and impinge into the concave cavity formed by the curved nose section 18. This will enable the sail structure to efficiently catch the wind and turn the oncoming wind into energy. Then, as viewed in FIG. 1, on the back side of the turbine, that is the side opposite the wind direction, the back side of the back would face the oncoming wind and will effectively reduce resistance or drag.

The turbine 10 illustrated in FIG. 1 is configured for turning clockwise. Note that the sails 16 are slightly angled with respect to the axis of the arms 18A. This angle can vary but in one embodiment, but, in one or more embodiments, the back of each sail is angled at an angle of approximately 7% off the axis of the adjoining arm 18A. That is the nose 18 of each sail is slightly positioned inwardly.

There are many advantages to the vertical axis type wind turbine of the present invention. One of the advantages revolves around the J-shaped sails and their ability to efficiently catch the wind and turn the force of the wind into efficient energy. More particularly, the J-shaped sails are effective in responding to low wind conditions and yet producing cost effective energy in low wind environments. Moreover, the J-shaped sails are designed to be relatively light but yet structurally sound.

Figure 9:
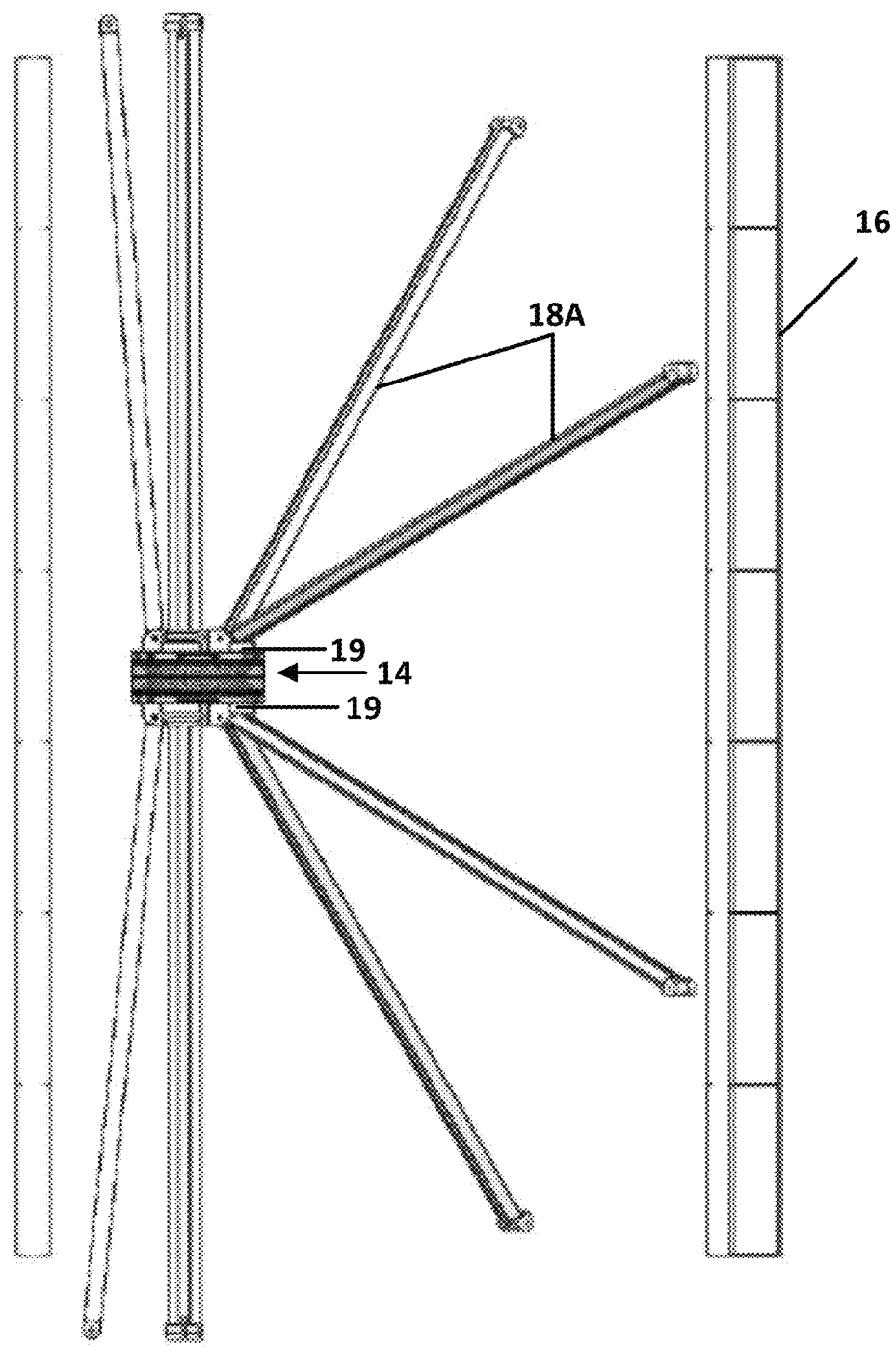
FIG. 9 illustrates the wind turbine assembly shown in which support arms are shown in a position where the wind turbine assembly is being readied for transport according to one or more embodiments disclosed herein.

One or more advantageous aspects of the one or more disclosed turbines 10 is the ability for the turbine 10 to be easily transported. Each of the upper half of arms 18A are configured for being pivoted about support 19 until they are pointed in a generally upwards direction and perpendicular to a ground surface. In FIG. 9, three of the five arms 19A on the upper half are shown being pivoted fully upright. Each of the lower half of arms 18A are configured for being pivoted about support 19 until they are pointed in a generally downwards direction and perpendicular to a ground surface. In this manner, the turbine 10 is easily portable by removing the sails and pivoting the arms 18A until the turbine assembly makes a generally cylindrical structure, which can then be bound or otherwise secured and transported.

Figure 10:
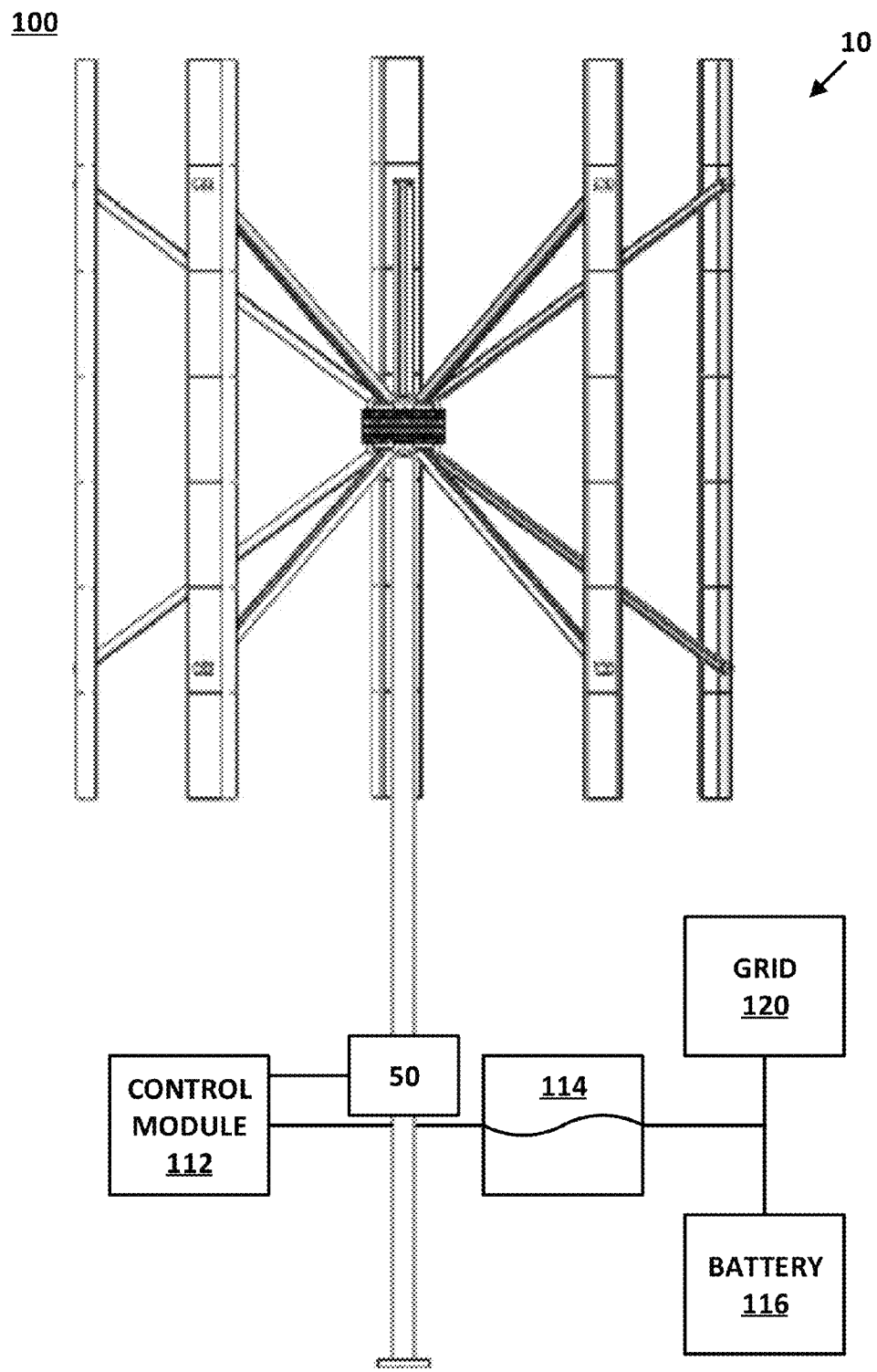
FIG. 10 illustrates a schematic of a system diagram according to one or more embodiments disclosed herein.

A system 100 is illustrated in the schematic of FIG. 10 that includes a wind turbine 10 disclosed herein. The system 100 may include a control module 112 that is configured to control the wind turbine 10, specifically the brake assembly 50 in order to adjust the rotational speed of the wind turbine 10 to desired levels. This adjustment may be accomplished by actuation of the actuator 52 to impart greater braking forces by the brake assembly 50 by varying the distance between plate 66 and magnet assembly 60. Control module 112 may also be configured to, for example, apply an additional external braking assembly, if one is provided, to further slow down the speed of the turbine assembly 10. Additionally, control module 112 may be further configured to actuate one or more switches in order to, for example, control current flow to an external storage source such as battery 116 or electrical grid 120. A signal conditioner 114, such as a power inverter or the like, may be provided for further conditioning of electricity before it is passed to the battery 116 or grid 120. The control module 112 is configured to communicate with the signal conditioner 114 in order to determine the rotational speed of the turbine 10. In this manner, the signal passing through conditioner 114 can be converted into a rotational speed of the turbine 10 and the control module 112 can then determine if adjustments to the rotation speed of turbine 10 are needed.

One or more advantageous aspects of the subject matter disclosed herein includes that the turbine assembly 10 may be provided with bearings between the generator assembly 14 and central post 12 such that parasitic rotational losses are minimized. Additionally, the 3:4 coil to magnet ration disclosed herein is especially advantageous because it has been determined, in one or more experiments, that this ratio produces electricity having a general consistency with the electrical grid and is thus suitable for return to the electric grid. Due to the combination of capturing energy in order to effectuate braking of the turbine assembly 10 when rotating at beyond desired speeds, turbine assembly 10 has very minimal losses due to braking and parasitic losses.

One or more methods 200 are depicted in FIG. 11 and generally designated 200. The one or more methods may include determining 202 a characteristic of energy at the downstream inverter 202. The one or more methods 200 may include 204 based on the determined characteristic, determining a rotational speed of the turbine assembly. The one or more methods 200 may include controlling 206 a brake assembly, such as brake assembly 50, to produce a retarding force corresponding to a desired rotational speed of the turbine assembly based on the determined speed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

I claim:

1. A turbine assembly comprising:
   a plurality of sails;
   a generator assembly configured to convert rotation thereabout to power; and
   a brake assembly separate from the generator assembly and including:
   a magnet assembly that rotates with rotation of the plurality of sails;
   a plate initially spaced-apart axially from the magnet assembly; and
   an actuator for translating the plate axially relative to the magnet assembly during rotation thereof to thereby induce eddy currents that create a magnetic field acting on the plate to impart a retarding force to control the rotational speed thereof; and
   a control module configured to control the actuator to adjust the axial spacing between the magnet assembly and the plate in order to maintain the turbine assembly at a predetermined speed.

2. The turbine assembly of claim 1, wherein the generator assembly includes:
   a coil mold having a plurality of coil packs therein; and
   a generator magnet assembly spaced-apart from the coil mold and configured to rotate with rotation of the plurality of sails.

3. The turbine assembly of claim 2, wherein the generator assembly is coupled to an electric grid.

4. The turbine assembly of claim 3, further comprising an inverter for conditioning energy generated by the generator assembly for the grid.

5. The turbine assembly of claim 4, wherein the control module is configured to:
   determine a characteristic of energy at the inverter;
   based on determining a characteristic of energy at the inverter, determine a rotational speed of the turbine assembly; and
   based on determining a rotational speed of the turbine assembly, adjust the axial spacing between the plate and magnet assembly to produce a desired retarding force about the plate to adjust the rotational speed of the turbine assembly to a desired rotational speed.

6. The turbine assembly of claim 2, wherein each coil pack is about 13.3 circumferential degrees from each adjacent coil pack, wherein the magnet assembly comprises an array or magnets, and further wherein each magnet of the array of magnets is about 10 circumferential degrees apart from each adjacent magnet.

7. The turbine assembly of claim 2, wherein the coil packs are equally-spaced circumferentially apart.

8. The turbine assembly of claim 2, wherein the coil mold defines one or more vents between adjacent coil packs for providing ventilation thereto.

9. The turbine assembly of claim 2, wherein the magnet assembly comprises an array of magnets spaced-circumferentially apart.

10. The turbine assembly of claim 9, wherein each magnet of the array of magnets is about 10 circumferential degrees apart from each adjacent magnet.

11. A method of adjusting a rotational speed of a wind turbine assembly, comprising: determining a characteristic of power generated by the turbine assembly; based on determining a characteristic of power, determining the rotational speed of the turbine assembly; and in response to determining the rotational speed of the turbine assembly, controlling a brake assembly to reduce the rotation speed of a wind turbine assembly, wherein the brake assembly includes: a magnet assembly that rotates with rotation of a plurality of sails carried by the wind turbine assembly; a plate initially axially spaced-apart from the magnet assembly; and an actuator for translating the plate axially relative to the magnet assembly during rotation thereof to thereby to thereby induce eddy currents that create a magnetic field acting on the plate to impart a retarding force to control the rotational speed thereof.

12. The method according to claim 11, wherein controlling the brake assembly to reduce the rotation speed of the wind turbine assembly comprises controlling the actuator to adjust the axial spacing between the magnet assembly and the plate.

13. The method according to claim 11, further comprising generating power upon rotation of the turbine assembly with a generator assembly, wherein the generator assembly comprises:
   a coil mold having a plurality of coil packs therein; and
   a magnet assembly spaced-apart from a plate and configured to rotate with rotation of the generator assembly.

14. The method according to claim 11, wherein:
   determining a characteristic of power generated by the turbine assembly comprises determining at an inverter downstream from the wind turbine assembly, a characteristic of energy at the inverter; and
   controlling the brake assembly to reduce the rotation speed of the wind turbine assembly comprises controlling the actuator to adjust the spacing between the magnet assembly and the conducting plate.

15. A system comprising:
   a turbine assembly including:
      a plurality of sails;
      a generator assembly configured to convert rotation thereabout to power; and
   a brake assembly separate from the generator assembly and including:
      a magnet assembly that rotates with rotation of the plurality of sails;
      a plate initially axially spaced-apart from the magnet assembly; and
      an actuator for translating the plate axially relative to the magnet assembly during rotation thereof to thereby induce eddy currents that create a magnetic field acting on the plate to impart a retarding force to control the rotational speed thereof; an inverter downstream from the generator assembly;
   a control module in communication with the inverter and configured to:
      determine a rotational speed of the turbine assembly based on a characteristic of the power at the inverter; and
      adjust an axial spacing between the magnet assembly and the plate in order to maintain the turbine assembly at a predetermined speed; and
   a power storage module operably coupled to the turbine assembly.

16. The system of claim 15, wherein the generator assembly includes:
   a coil mold having a plurality of coil packs therein; and
   a magnet assembly spaced-apart from the coil mold and configured to rotate with rotation of the plurality of sails.

17. The system of claim 16, wherein the magnet assembly comprises an array of magnets spaced-circumferentially apart.

18. The system of claim 17, wherein each magnet of the array of magnets is about 10 circumferential degrees apart from each adjacent magnet.

19. The system of claim 16, each coil pack is about 13.3 circumferential degrees from each adjacent coil pack, wherein the magnet assembly comprises an array or magnets, and further wherein each magnet of the array of magnets is about 10 circumferential degrees apart from each adjacent magnet.

20. The system of claim 16, wherein the coil packs are equally-spaced circumferentially apart.

21. The system of claim 16, wherein the coil mold defines one or more vents between adjacent coil packs for providing ventilation thereto.

22. The system of claim 21, further including a ferrous metal placed on each side of the vent for increasing magnetic field saturation within each coil pack.

23. The system of claim 21, wherein a back face of each sail of the plurality of sails defines a 7% angle of inclination.

* * * * *